United States Patent
Brandt et al.

(10) Patent No.: US 9,588,894 B2
(45) Date of Patent: *Mar. 7, 2017

(54) STORE CACHE FOR TRANSACTIONAL MEMORY

(71) Applicant: International Business Machines Corporation, Armonk, NY (US)

(72) Inventors: Uwe Brandt, Stuttgart (DE); Willm Hinrichs, Holzgerlingen (DE); Walter Lipponer, Ammerbuch (DE); Martin Recktenwald, Schönaich (DE); Hans-Werner Tast, Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/578,889

(22) Filed: Dec. 22, 2014

(65) Prior Publication Data

US 2016/0132431 A1    May 12, 2016

Related U.S. Application Data

(63) Continuation of application No. 14/537,131, filed on Nov. 10, 2014.

(51) Int. Cl.
*G06F 12/00* (2006.01)
*G06F 12/08* (2016.01)
(Continued)

(52) U.S. Cl.
CPC .......... *G06F 12/0808* (2013.01); *G06F 3/061* (2013.01); *G06F 3/0638* (2013.01);
(Continued)

(58) Field of Classification Search
None
See application file for complete search history.

(56) References Cited

U.S. PATENT DOCUMENTS 6,990,557 B2   1/2006   Hokenek et al.
8,229,907 B2   7/2012   Gray et al.
(Continued)

OTHER PUBLICATIONS

List of IBM Patents or Patent Applications Treated as Related, Dec. 22, 2014.

(Continued)

*Primary Examiner* — Daniel Tsui
(74) *Attorney, Agent, or Firm* — Isaac J. Gooshaw

(57) ABSTRACT

A method to merge one or more non-transactional stores and one or more thread-specific transactional stores into one or more cache line templates in a store buffer in a store cache. The method receives a thread-specific non-transactional store address and a first data, maps the store address to a first cache line template, and merges the first data into the first cache line template, according to a store policy. The method further receives a thread-specific transactional store address and a second data, maps the thread-specific store address into a second cache line template, according to a store policy. The method further writes back a copy of a cache line template to a cache and invalidates a third cache line template, which frees the third cache line template from a store address mapping.

10 Claims, 6 Drawing Sheets

(51) Int. Cl.
*G06F 3/06* (2006.01)
*G06F 9/46* (2006.01)

(52) U.S. Cl.
CPC ............ *G06F 3/0683* (2013.01); *G06F 9/467* (2013.01); *G06F 12/084* (2013.01); *G06F 12/0811* (2013.01); *G06F 12/0891* (2013.01); *G06F 12/0897* (2013.01); *G06F 2212/1016* (2013.01); *G06F 2212/1024* (2013.01); *G06F 2212/152* (2013.01); *G06F 2212/608* (2013.01); *G06F 2212/6042* (2013.01); *G06F 2212/62* (2013.01); *G06F 2212/69* (2013.01)

(56) References Cited

U.S. PATENT DOCUMENTS

| | | |
|---|---|---|
| 8,566,524 B2 | 10/2013 | Heller, Jr. |
| 2009/0019231 A1* | 1/2009 | Cypher ................. G06F 12/08 711/141 |
| 2010/0153655 A1* | 6/2010 | Cypher ................ G06F 9/3851 711/139 |
| 2012/0089784 A1 | 4/2012 | Surtani et al. |
| 2013/0304994 A1 | 11/2013 | Koob et al. |
| 2014/0006698 A1 | 1/2014 | Chappell et al. |

OTHER PUBLICATIONS

Koo et al.; "Reducing cache misses through cache line overlapping"; Electronics Letters, vol. 42; No. 10; May 11, 2006.
U.S. Appl. No. 14/537,131, filed Nov. 10, 2014 entitled "Store Cache for Transactional Memory".

* cited by examiner

STORE CACHE FOR TRANSACTIONAL MEMORY

BACKGROUND OF THE INVENTION

The present invention relates generally to the field of computer memory management, and more specifically to techniques for improving the efficiency of transactional memory.

Many computer systems employ cache memory to speed data retrieval operations. Cache memory stores copies of data found in frequently used main memory locations. Accessing data from cache memory speeds processing because cache memory can typically be accessed faster than main memory. If requested data is found in cache memory, then it is accessed from cache memory. However, if requested data is not found in cache memory, then the data is first copied into cache memory and then accessed from the cache memory.

Multi-level cache is an architecture in which there are multiple cache memories. For example, a computing system may have three levels, i.e. an L1 cache, an L2 cache, and an L3 cache. Typically, in a multi-level cache configuration, L1 would be the smallest and, thus, the easiest to search. If requested data is not found in L1 cache, the system searches L2 cache, which may be larger than L1 cache and, thus, take longer to search. In a similar fashion, if the data is not found in L2 cache, L3 cache is searched. Main memory is only searched after a determination has been made that the requested data is not in any of L1, L2, or L3 cache. Of course, there are many different implementations of cache memory.

Since the access time of a cache is often critical to the performance of a code that is executing, and a cache is often busy with many operations, it is beneficial to decrease a cache's workload, if possible. One common technique used to decrease a cache's workload includes accumulating multiple stores that store into to a common cache line in a cache line buffer, and then storing the contents of the cache line buffer into a cache as a single operation. This decreases a cache's workload and improves its response time and, thus, potentially improves the performance of a code that is executing. Such a technique is commonly performed in a mechanism called a store cache.

Transactional memory is a type of memory that groups multiple store operations performed by a processor into a single transaction that is visible to other processors as a single operation. The effects (e.g., the data) of multiple store operations participating in the single transaction are not made visible to other processors until the transaction is complete. Transactional memory is often helpful in synchronizing work that is performed in parallel on multiple CPUs.

SUMMARY

A method to merge one or more non-transactional stores and one or more thread-specific transactional stores into one or more cache line templates in a store buffer in a store cache is presented. The method includes receiving a thread-specific non-transactional store address and a first data, mapping the store address to a first cache line template, and merging the first data into the first cache line template, according to a store policy. The method further includes receiving a thread-specific transactional store address and a second data, mapping the thread-specific transactional store address to a second cache line template, and merging the second data into a second cache line template, according to a store policy. The method further includes writing back a copy of a cache line template to a cache and invalidating a third cache line template, which frees the third cache line template from a store address mapping.

DETAILED DESCRIPTION

Figure 1:
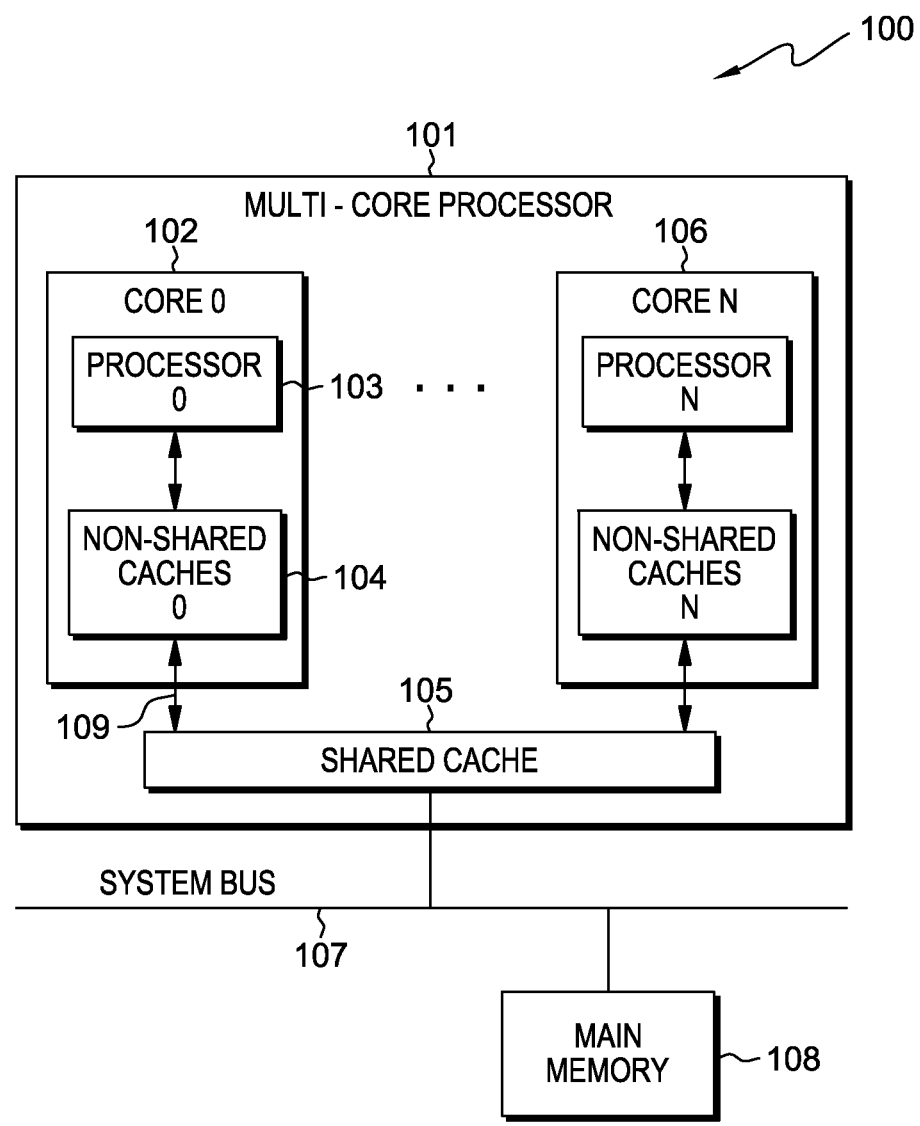
FIG. 1 depicts a block diagram of a portion of a computing complex, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A memory hierarchy in a modern computer often includes multiple layers of cache, some layers dedicated to, and accessible by, a single processor and other, lower and larger layers of cache accessible by multiple processors. A cache often provides a quick access to recently accessed data or to data near recently accessed data. Caches are given labels in their order of logical position relative to a given processor, L1, L2, L3, etc., with the L1 cache logically nearest to the processor. This ordering is also the order in which the caches are accessed when the processor is attempting to read data. L1 is first accessed for the data, then L2 if the data is not found in L1, and so on. An L0 cache is sometimes employed that is small and tightly integrated with the processor, often providing 1-cycle access. An L0 cache, if it exists, is logically closer to the processor than an L1 cache. The levels of cache in a computer system, together with the main memory (often a large dynamic RAM), constitute the memory hierarchy of the computer system. In the context of a memory hierarchy, the term "below" means logically further away from the processor.

Many techniques have been developed to increase the efficiency of a memory hierarchy. Memory hierarchy efficiency relative to a benchmark program is usually measured by its average access time during the execution of the benchmark program. A store cache is a technique that improves average access time by decreasing the workload of a cache in the next cache layer below that of the store cache. It does this by accumulating stores to a cache line in a buffer and then writing the contents of the buffer to the cache line in the next layer of cache in one access, eliminating the multiple accesses that would have transpired had each separate store performed a store operation.

In modern computing systems that have multiple processors, there is an effort to increase performance by computing parts of a program in parallel on the same processor, if the processor is multithreaded and/or on multiple different processors, and combine or compare results as needed intermittently during an execution. This is often accomplished by synchronizing multiple threads of execution on the same or different processors, and/or making results produced by one thread of execution visible to other threads of execution. Synchronization is often accomplished by executing "atomic" instructions and groups of instructions. An atomic instruction appears to execute "all at once" to other threads of execution and to other processors, i.e., the atomic instruction can never be observed to be partially complete. In like manner, a group of instructions may be made atomic by making their effect visible all at once to other threads and processors. Memory operations are often available in an atomic version because multiple threads of execution often communicate and synchronize with each other through values written to and read from memory locations known by all participating threads of execution. For example, an atomic instruction may read a memory location, and if the memory location contains a specific value, write another value back to the same memory location in a single atomic operation. This action would tell other processes that may be testing the variable (by reading it).

A modern technique that may improve the performance of an application executing on a processor is to execute some instructions speculatively when there resources available to do so. Speculative execution is a term that refers to an execution that is probably going to happen in the future, but may not actually happen. This usually occurs when a branch instruction is seen in the instruction stream and its behavior is predicted based on previous behavior, because the information that determines its actual behavior is not yet available. Instead of waiting for this information to become available, the processor can do work based on a predicted path that this branch will probably take, and execute instructions on this predicted path. The instructions executed on this predicted path are speculative instructions—until it is known that they are on an actual path of execution, i.e., that the branch was predicted correctly. If it turns out that these speculative instructions are on the wrong actual path of execution (wrong prediction), the effects of these instructions must be squashed, i.e., eliminated, undone, and not be visible to other processors.

Squashing the effects of instructions that were executed speculatively but shouldn't have been executed can be a demanding design challenge, and is especially demanding regarding speculative store instructions that should not have been executed. If a store that should not have been executed stores data to memory, it may overwrite data that should not have been overwritten, and the written data may be read and used by the same or a different processor in an application. Some computer architectures solve this problem by not executing speculative store instructions (which decreases performance). An alternative approach is to prevent other threads of execution from seeing the data produced by a speculative store until it is known to be on the correct path, and to delete the data if it is a result of a store on an incorrect path.

Simultaneous multithreading is a technique often incorporated in modern processors that enables a single processor to execute multiple applications concurrently (or multiple parts of the same application), with each application having its own thread of execution. The single processor fetches instructions on each thread separately and executes the instructions on shared execution units (e.g., adders, multipliers, etc.) within the processor, all the while keeping track of which instructions belong to which thread. If such treads are synchronizing their work with other threads, they often do so via the execution of atomic instructions, or groups of instructions, whose execution is made atomic.

A technique to make groups of store instructions atomic is the use of transactional memory.

FIG. 1 depicts processor complex 100, that includes multi-core processor 101 connected to main memory 108 by system bus 107. A core is an independent processing system, often including a processor and one or more caches, that is usually on a common semiconductor die with other cores. Multi-core processor 101, is comprised of multiple cores, core_0 102 through core_n 106, with each core comprised of a multithreaded processor and dedicated non-shared caches. A non-shared cache is a cache that is dedicated to a processor, and is only accessible by the processor to which it is dedicated. Core_0 102 contains processor_0 103 and non-shared caches_0 104, which is connected to shared cache 105 via bus 109. Shared cache 105 is accessible by any of the cores attached to it, i.e., core_0 102 through core_n 106. A processor in multi-core processor 101 will look for a data in its non-shared caches first; for example, processor 103 will look for the data in non-shared caches_0 first, and then if the data is not found there, will look for the data in shared cache 105, and if not found there, will look for the data in main memory 108. Non-shared caches_0 104, shared cache 105, and main memory 108 comprise the memory hierarchy of multi-processor 101.

Figure 2:
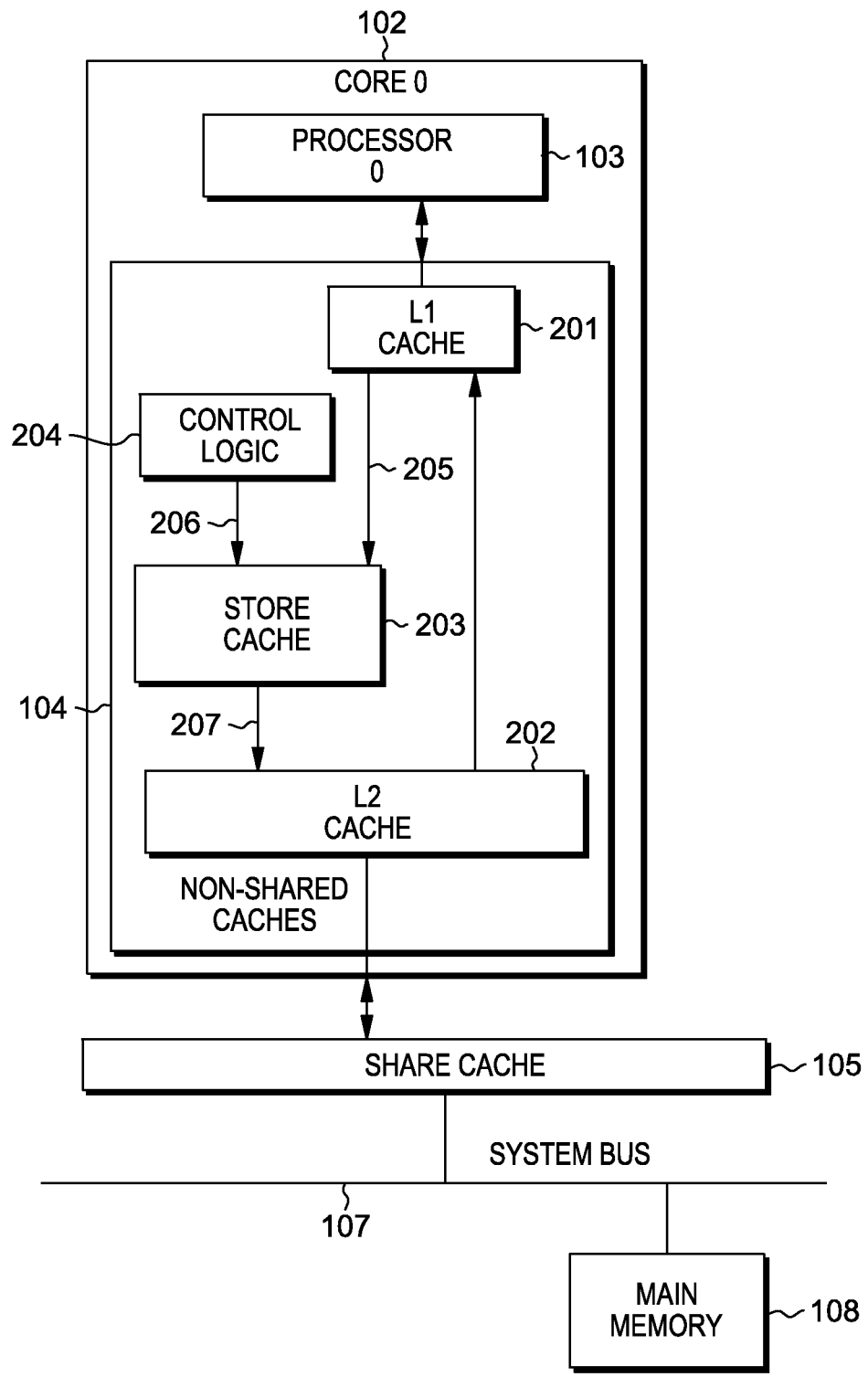
FIG. 2 depicts a memory hierarchy depicted in FIG. 1, in accordance with an embodiment of the present invention.

FIG. 2 depicts core_0 102 and non-shared caches 104 in more detail. In an embodiment, non-shared caches 104 is comprised of L1 cache 201 store cache 203 and L2 cache 202. In an embodiment, L1 cache 201 is a level 1 cache that is a store-through cache. A level 1 cache is a cache that is often logically closer to a processor than other caches that may comprise a memory hierarchy. It is the first cache that is accessed when a processor accesses memory for data or writes data to memory. If processor_0 103 attempts to read data from L1 cache 201 and the data is not in L1 cache 201, L1 cache 201 will attempt to read the data from L2 cache 202. If successful, L1 cache 201 will both store the data internally and pass the data back to processor_0 103.

A store-through cache stores data that is written to it and passes the data to the next logically lower memory in a memory hierarchy. In an embodiment, L1 cache 201 passes data that is written into it to store cache 203 over store bus 205. Store cache 203 consolidates data that it receives into cache line templates and forwards the data in the cache line templates to L2 cache 202 over write-back store bus 207 when directed by one or more commands asserted on command bus 206 by control logic 204. In an embodiment, a cache line template is a template (i.e., a pattern) of part of a cache line in L2 cache 202 that is initially empty, and can be populated by store cache 203 with data in stores as they are received by store cache 203. A cache line template is a replica of the form of at least part of an actual cache line and can contain the same amount of data as the part of a cache line for which it is a template. In an embodiment, a cache line template is a replica of half of a cache line in L2 cache 202. A cache line template is partitioned into sections that match those of the cache line. The process that populates a cache line template with data in store cache 203 is called merging. Data that is stored into a cache line template is said to be merged into the cache line template. Store cache 203 can perform merging operations that involve data from both transactional stores and non-transactional stores that are received on store bus 205.

A thread of execution (i.e., a thread), identified with a thread identifier, is either in a transactional state or in a non-transactional state. A thread enters a transactional state if a T_BEGIN command that identifies the thread is given to store cache 203 by control logic 204 on command bus 206. The thread for which a transactional state has been entered is said to be in a transaction. A store is transactional, i.e., it is a transactional store if it is executed in a thread that is in a transactional state. The data of a transactional store is accumulated with the data from other transactional stores by the same thread into one or more cache line templates and is not made immediately visible to other processors until released. Store cache 203 releases all the data accumulated during a thread's transaction if a T_END command, that identifies the thread, is received by store cache 203 from control logic 204 on command bus 206. Store cache 203 releases the data, which is no longer transactional data, enabling the data to be written back to L2 cache 202. After store cache 203 releases the data and while the data is still in store cache 203, data in additional stores can be merged into the released data.

If store cache 203 receives a T_ABORT command from control logic 204 on command bus 206 for a thread in a transactional state, all existing data in cache line templates associated with the thread is discarded, and the cache line templates are freed for other store cache merging operations, unless the cache line template is marked non-abortable. A non-abortable cache line template contains data stored by a thread in a transactional state, but is not discarded if the transaction in which the cache line template was stored into is aborted. For a given thread in a transactional state, a T_ABORT command can only be received by store cache 203 after a T_BEGIN command and before a T_END command; that is, a T_ABORT command cannot be received after a T_END command with no intervening T_BEGIN command. Additionally, for a given thread, a T_END cannot be received after a T_ABORT.

Figure 3:
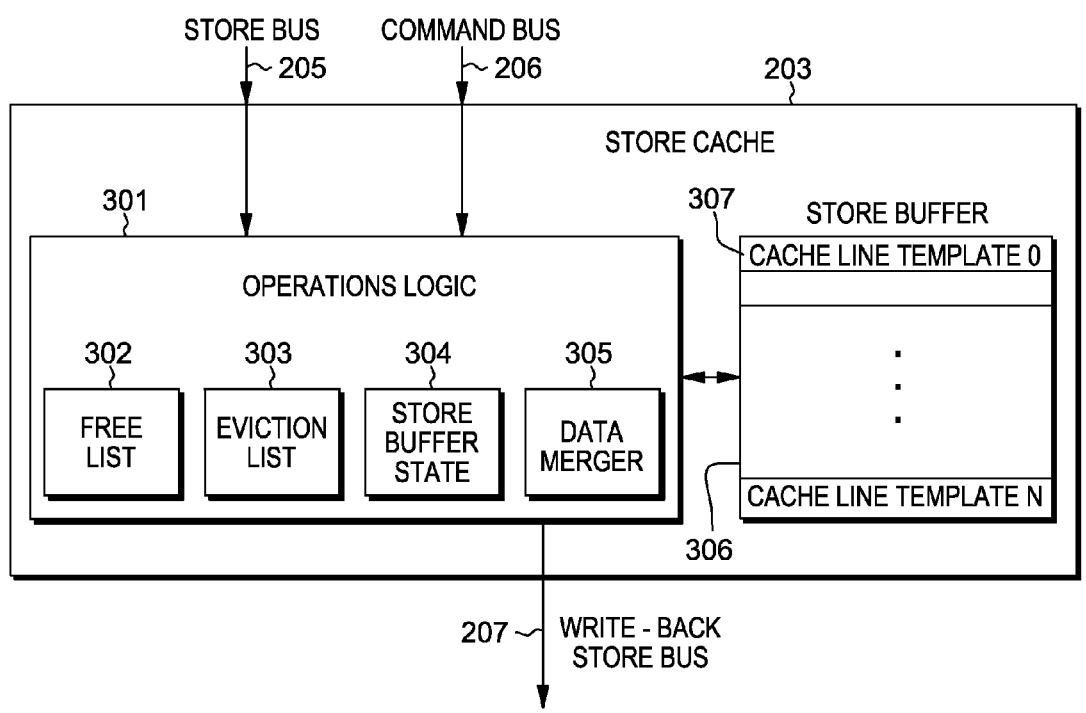
FIG. 3 depicts a detail of a store cache depicted in FIG. 2, in accordance with an embodiment of the present invention.

FIG. 3 depicts an embodiment of store cache 203 in more detail. Store cache 203 is comprised of store buffer 306, that holds cache line templates (e.g., cache line template_0 307) in entries, one cache line template per entry, and operations logic 301 that accepts commands on command bus 206, stores on store bus 205, and performs store cache operations. Store cache operations include, allocating a new cache line template in store buffer 306, merging the data in a store received on store bus 205 with a cache line template, evicting a cache line template (writing it back to L2 cache 202), and deleting a cache line template from store buffer 306. In an embodiment, store buffer 306 is a fully associative buffer.

In general, a fully associative buffer is accessed with a "key" that is used to locate information linked to the key that can be located anywhere in the buffer. A key and its associated information is stored in each entry in the fully-associative buffer, and each entry compares its own key with the access key used to access the buffer (there is comparator logic in each entry in the buffer). If the access key matches a key in a buffer entry, the information in the buffer entry linked to the key is outputted.

In an embodiment, an entry in store buffer 306 is accessed with either of two keys, and either key can be used to access the entry in store buffer 306. One key is a store address and one key is an entry index. A store address key is used to access a cache line template with a specific address in store buffer 306, if a cache line template with that address is in store buffer 306. An entry index is a unique key that is permanently assigned to an entry in store buffer 306. That is, each entry in store buffer 306 has a permanent unique entry index assigned to it, which is different from an entry index that is assigned to another entry. An entry index is used to access a particular entry in store buffer 306, regardless of the contents of the entry.

In an embodiment, operations logic 301 is comprised of free list 302, eviction list 303, store buffer state 304, and data merger 305. Free list 302 contains a list of the entry indexes of the empty entries in store buffer 306. Eviction list 303 contains a list of the entry indexes of entries in store buffer 306 that contain a cache line template to be evicted from store buffer 306 and written back to L2 cache 202. Store buffer state 304 records the state of each entry in store buffer 306. An entry is in one or more states. It may be "free" (unused and on free list 302), mergeable (new stores may be merged with the cache line template that it contains), "evict" (the entry is on the eviction list and will be evicted), "transactional" (the data in the cache line template that it contains was allocated by a store within an active transaction on a thread), "aborted" (the entry is part of a transaction that was aborted), and "non-abortable" (an entry for a store in an active transaction that is not aborted if the transaction is aborted). The store buffer also records a thread identifier for each entry in store buffer 306 that is not in a free state.

In an embodiment, additional state information is included in store buffer state 304 for each entry in store buffer 306. For example, in an embodiment, a "requesting eviction" state is included that indicates that the cache line template in an entry is marked to be evicted (written-back) but is still mergeable. In an embodiment, a "drain requested" state is included that indicates that all entries in a drain requested state be written back to L2 cache 202, and when the drain operation has completed, that an acknowledgement to that effect be sent back to a requester of the drain operation. In an embodiment, a "store to other level of cache hierarchy pending" state is included that indicates that a store is pending somewhere in the cache hierarchy (that part of the memory hierarchy that is comprised of caches). This state is used to maintain cache coherency if one or more caches following store cache 203 are write-through caches, and the effects of a cache line write-back from store cache 203 to L2 cache 202 has not yet been felt throughout the memory hierarchy.

In an embodiment, a plurality of individual sections of a cache line template are given a state associated that is independent of the state of other sections in the same cache line template. For example, in an embodiment, an individual section of a cache line template is marked as in a non-abortable state and, if in this state, the data in this section is not aborted (discarded) if data in other sections of the same cache line template are aborted.

Figure 4:
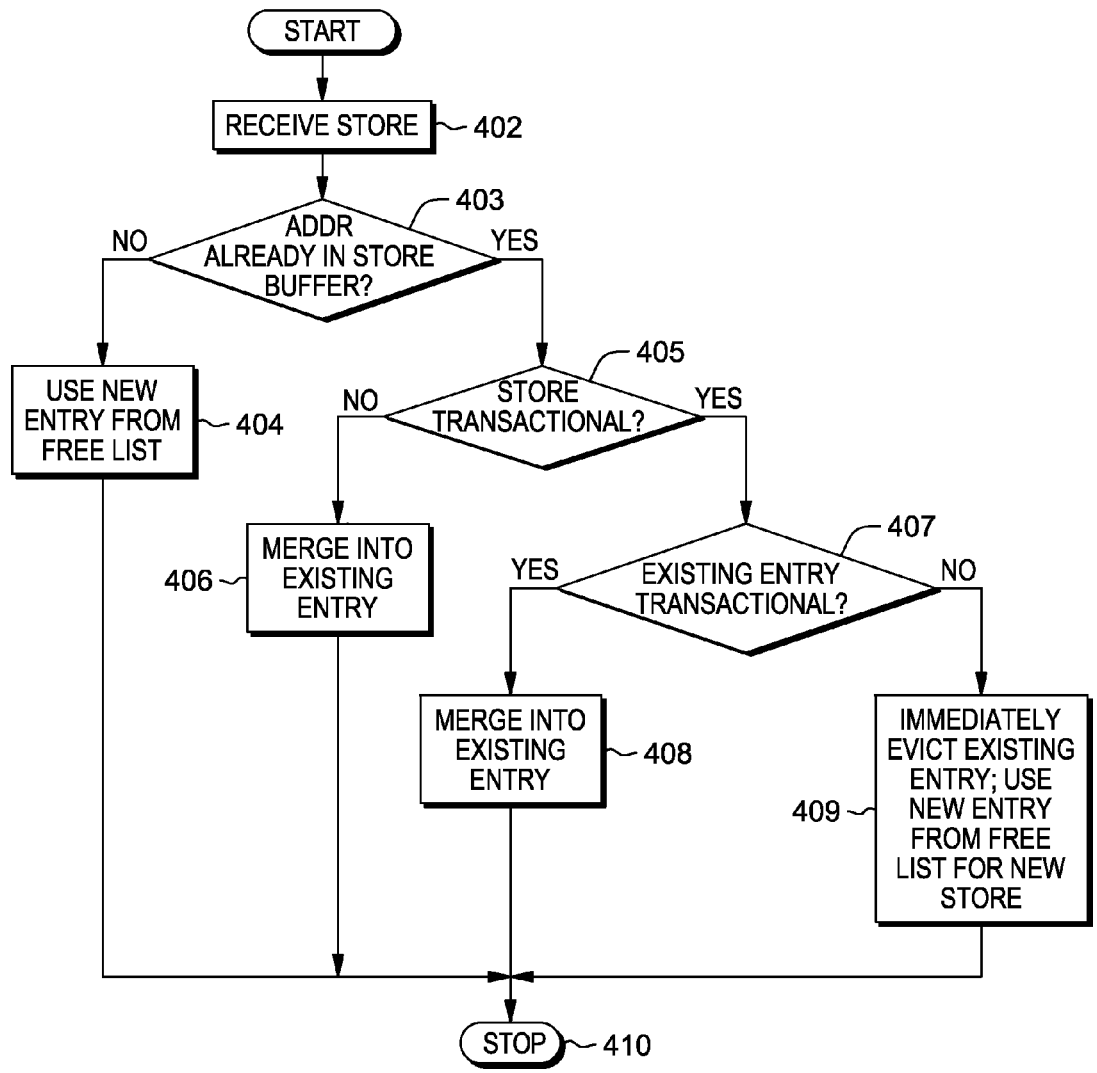
FIG. 4 depicts a flow chart for an operation of the store cache depicted in FIG. 3, in accordance with an embodiment of the present invention.

FIG. 4 is a flow chart of the decisions taken by operations logic 301 when a store S, with address A, and data D, on thread T is received on store bus 205. The flow chart begins with operations logic 301 receiving store S, with address A, and data D, on thread T, on store bus 205 (step 402). Operations logic 301 accesses store buffer 306 with address A and thread identifier T, and determines if store buffer 306 contains a cache line template with address A on thread T (decision step 403). If store buffer 306 contains a cache line template with address A on thread T (i.e., CacheLineTemplate_AonT) (decision step 403, YES branch), then operations logic 301 determines if store S is transactional (decision step 405). If store S is transactional (decision step 405, YES branch), then operations logic 301 determines if CacheLineTemplate_AonT is transactional in decision step 407.

In an embodiment, in decision step 407, operations logic 301 accesses store buffer state 304 to determine if CacheLineTemplate_AonT is transactional. In an embodiment, one or more transaction bits are associated with each cache line template in store buffer 306 to indicate whether an associated cache line template is transactional. In this case, operations logic 301 examines the transaction bits associated with CacheLineTemplate_AonT to determine if CacheLineTemplate_AonT is transactional.

If CacheLineTemplate_AonT is transactional (decision step 407, YES branch), and store S is transactional, then a merge operation is enabled and operations logic 301 invokes data merger 305, which merges data D into CacheLineTemplate_AonT in store buffer 306 (in step 408), and processing of store S terminates in step 410. Therefore, since thread identifiers are examined, two transactional stores from two different threads will never be merged.

If in step 407, operations logic 301 determines that CacheLineTemp_AonT is not transactional (decision step 407, NO branch), then operations logic inserts the entry index of CacheLineTemplate_AonT on eviction list 303 so it is enabled to be evicted, reads an entry index of a free entry from free list 302, and inserts data D from store S into the cache line template in the entry in store buffer 306 specified by the entry index of the free entry, CacheLineTemp_New (in step 409).

If in step 405, operations logic 301 determines that store S is not transactional (decision step 405, NO branch), then operations logic 301 invokes merger 305 which merges data D into CacheLineTemplate_AonT in store buffer 306 (in step 406) and processing of store S terminates in step 410.

If in step 403, operations logic 301 accesses store buffer 306 with address A and thread identifier T and determines that store buffer 306 does not contain a cache line template with address A on thread T (decision step 403, NO branch), then operations logic 301 reads an entry index of a free entry from free list 302, and inserts data D from store S into the cache line template in the entry in store buffer 306 specified by the entry index of the free entry (step 404), and the processing of store S terminates in step 410.

Figure 5:
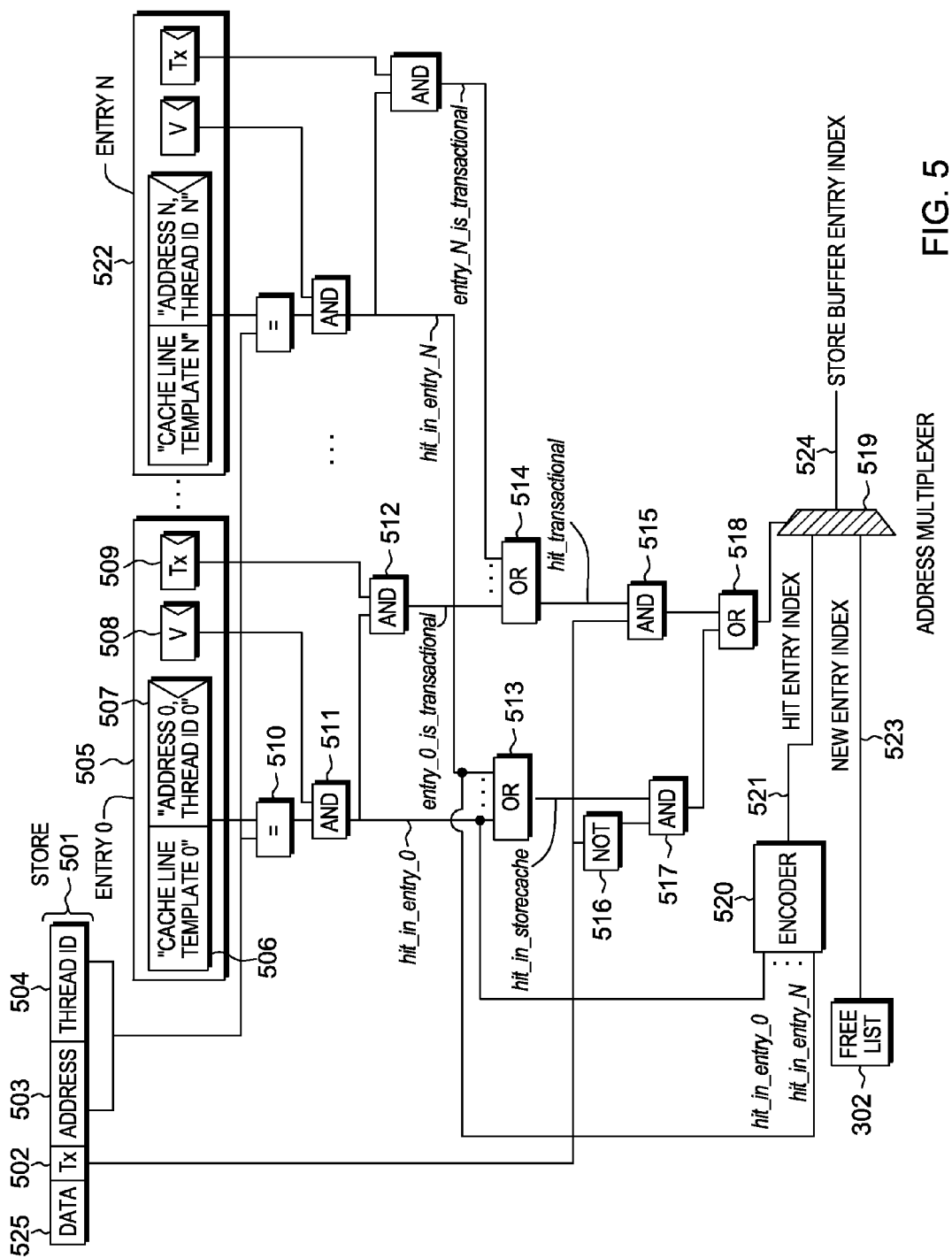
FIG. 5 depicts a logic for an operation of the store cache depicted in FIG. 3, in accordance with an embodiment of the present invention.

FIG. 5 depicts a logic in an embodiment of store buffer 306 that outputs the entry index of an occupied entry in store buffer 306 to be written into when the data in store 501 is to be merged into the occupied entry, termed a hit entry index, and outputs the new entry index of a free entry from free list 302 otherwise. In an embodiment, store 501 is comprised of data 525, transaction flag 502, address 503, and thread identifier 504. Transaction flag 502 is a logic "1" if store 501 is transactional, and a logic "0" if it is not transactional. In an embodiment, store buffer generates transaction flag 502 upon examining thread identifier 504. If thread identifier 504 is the thread identifier of a transactional thread, then transaction flag 502 is set to a logical 1 and transaction flag 502 is set to a logical 0 if thread identifier 504 is not the thread identifier of a transactional thread.

In an embodiment, store buffer 306 is comprised of N+1 entries, entry_0 505 through entry_N 522. Each entry in store buffer 306 is comprised of four fields, a cache line template field, an address and thread ID field, a valid field, and a transactional field. The valid field indicates, with a logic 1, whether the contents of the cache line template field, the address and thread ID field, and the transactional field contain valid information. For example, store buffer 306 entry_0 505 is comprised of cache line template field 506, address and thread ID field 507, valid field 508, and transactional field 509.

In an embodiment, operations logic 301 determines a location to merge data 525 in store 501 that it receives by accessing store buffer 306 with transaction flag 502, address 503, and thread ID 504 in store 501. Because store buffer 306 is fully associative, a cache line template and address associated with address 503 and thread 504 can be located in any entry. Therefore, the contents of the address field of all the entries in store buffer 306 are compared with address 503. For example, the contents of address 507 in entry_0 505 is compared with address 503 and thread 504.

Compare equal logic 510 outputs a logic 1 if the contents of address and thread ID field 507, match address 503, and thread 507, and compare equal logic 510 outputs a logic 0 otherwise. The output of compare equal logic 510 is one of two inputs to AND gate 511. Valid field 508 in entry_0 505 is a logic 1 if entry_0 505 contains valid information, and is a logic 0 otherwise. Valid field 508 is the second input to AND gate 511. Therefore, AND gate 511 outputs a logic 1 if the contents of address and thread ID field 507 match address 503 and thread 507 and the contents of address and thread ID field 507 is valid. This situation is termed a hit in entry_0 505. The output of AND 511 gate is an input to OR gate 513. OR gate 513 receives a substantially similar input, i.e., an indication of a hit in a specific entry from each entry in store buffer 306. Therefore, a logic 1 is felt on the output of OR gate 513 if the contents of a valid address and thread in any entry match address 503 and thread 507; otherwise, a logic 0 is felt on the output of OR gate 513. The output of OR gate 513 is felt on one of the two inputs of AND gate 517.

The output of AND gate 511 is one of two inputs to AND gate 512. Transaction flag 509 is the second input to AND gate 512. Therefore, the output of AND gate 512 is a logic 1 if the address and thread ID in store 501 matches a valid address and thread ID in entry_0 505, and both store 501 and the contents of entry_0 505 are transactional. This situation is termed a transactional hit in entry_0 505. The output of AND 512 gate is an input to OR gate 514. OR gate 514 receives a substantially similar input, i.e., an indication of a transactional hit in a specific entry from each entry in store buffer 306. Therefore, OR gate 514 outputs a logic 1 if there is a transactional hit in any entry in store buffer 306, and OR gate 514 outputs a logic 0 otherwise. The output of OR gate 514 is one of the two inputs to AND gate 515.

The output of AND gate 511 (a hit in entry_0 505) is also an input to encoder 520. Encoder 520 receives a substantially similar input, i.e., an indication of a hit in a specific entry, from each entry in store buffer 306. Encoder will receives a logic 0 on all of its inputs or a logic 1 on only one of its inputs. That is, either no hit will occur on any entry in store buffer 306, or one and only one hit on one entry will occur in store buffer 306. Encoder 520 encodes a bit pattern of a logic 1 on one of its inputs with a logic 0 on each of the remainder of its inputs into an entry index, termed a hit entry index, of an entry in which a hit occurred, i.e., the entry that caused a logic 1 input to be received by encoder 520. If encoder 520 receives a logic 0 on each of its inputs, a hit in an entry in store buffer 306 did not occur and, while this input pattern is encoded and output by encoder 520, this output is not used to select an entry.

Transaction flag 502 of store 501 is felt on the input to NOT gate 516 and, therefore, its inverse is felt on the output of NOT gate 516. The output of NOT gate 516 is a logic 1 when store 501 is not transactional, and is a logic 0 otherwise, and is one of two inputs to AND gate 517. The other input of the two inputs to AND gate 517 is the output of OR gate 513, which is a logic 1 if the contents of a valid address and thread in any entry match address 503 and thread 507 in store 501. Therefore, the output of AND gate 517 is a logic 1 if store 501 is not transactional, and address 503 and thread ID 504 in store 501 match that in an entry in store buffer 306. The output of AND gate 517 is one of two inputs to OR gate 518.

Transaction flag 502 in store 501 is felt on one of the two inputs to AND gate 515. The other of the two inputs to AND gate 515 is the output of OR gate 514, which is a logic 1 if the contents of a valid address and thread in any transactional entry match address 503 and thread 507 in store 501. Therefore, the output of AND gate 515 is a logic 1 if store 501 is transactional, and address 503 and thread ID 504 in store 501 match that in a transactional entry in store buffer 306. The output of AND gate 515 is one of two inputs to OR gate 518. Therefore, the output of OR gate 518 is a logic 1 if address 503 and thread ID 504 in store 501, with transaction flag 502 a logic 1, match an address and a thread ID in a transactional entry in store buffer 306, or if address 503 and thread ID 504 in store 501, with transaction flag 502 a logic 0, match an address and a thread ID in a non-transactional entry in store buffer 306. The output of OR gate 518 is a logic 0 otherwise.

The output of OR gate 518 selects one of two inputs to address multiplexer 519. One input to address multiplexer is the output of encoder 520 which is hit entry index 521, and this input is selected if the output of OR gate 518 is a logic 1. The other input to address multiplexer is the output of free list 302, new entry index 523, and this input is selected if the output of OR gate 518 is a logic 1. Therefore, the output of address multiplexer 519 is store buffer entry index 524, which is selected from either new index 523 or hit entry index 521.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Figure 6:
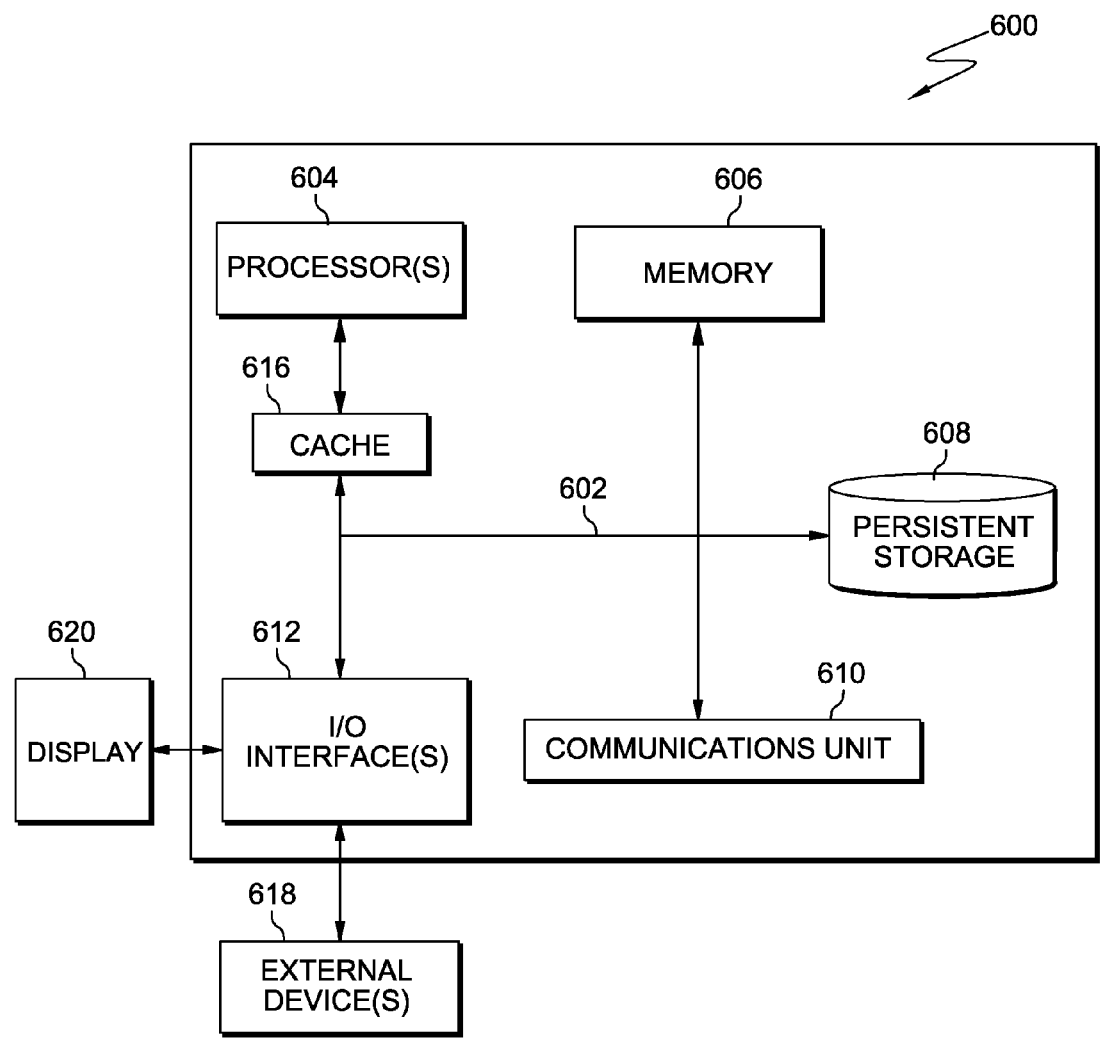
FIG. 6 depicts a block diagram of a computer system that incorporates the store cache that is depicted FIGS. 1, 2 and 3, in accordance with an embodiment of the present invention.

FIG. 6 depicts computer system 600, that is an example of a system that includes store cache 203. Processors 604 and cache 616 are substantially equivalent to multi-core processor 101. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective processors 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A method to merge one or more non-transactional stores and one or more thread-specific transactional stores into one or more cache line templates in a store buffer in a store cache, the method comprising:
   receiving a non-transactional store address and a first data;
   mapping the non-transactional store address to a first cache line template in a store buffer, wherein the non-transactional store address is mapped to a first cache line template in the store buffer by a free list;
   merging the first data into the first cache line template, according to a non-transactional store policy;
   receiving a thread-specific transactional store address and a second data;
   mapping the thread-specific transactional store address to a second cache line template in the store buffer;
   merging the second data into a second cache line template, according to a transactional store policy; and
   writing-back a copy of a cache line template that is in the store buffer to a cache; and
   invalidating a contents of a third cache line template, wherein the invalidation frees the third cache line template from a store address mapping.

2. The method of claim 1, wherein the store buffer is a fully associative buffer comprising one or more cache line templates, each cache line template with a cache line template information.

3. The method of claim 1, wherein the cache line template is in a format of a cache line in a cache.

4. The method of claim 1, wherein the transactional store policy is comprised of:
   writing-back a non-transactional store buffer entry if the address of a transactional store is mapped to the non-transactional store buffer entry; and
   merging a transactional store into a transactional store buffer entry that the address of the transactional store maps to.

5. The method of claim 1, wherein the non-transactional store policy is comprised of:
  writing-back a non-transactional store buffer entry if the address of a transactional store is mapped to the non-transactional store buffer entry;
  writing-back a non-transactional store buffer entry that is marked for eviction; and
  writing-back a non-transactional store buffer entry that is associated with a thread that is the thread identified in a store buffer drain request.

6. The method of claim 2, wherein the non-transactional store address is mapped to a first cache line template in a store buffer by accessing the store cache with the store address.

7. The method of claim 1, wherein the thread-specific transactional store address is mapped to a first cache line template in a store buffer by a free list.

8. The method of claim 2, wherein the thread-specific transactional store address is mapped to a first cache line template in a store buffer by accessing the store cache with the store address.

9. The method of claim 1, wherein merging comprises:
  writing a data associated with a store into a cache line template in a relative position in the cache line template that matches a relative position the data will take in a cache line in a cache if the data is written back to the cache.

10. The method of claim 4, further comprising:
  marking a transactional store buffer entry that is associated with an aborted transaction for eviction unless the transactional store buffer entry is a non-aborted store entry; and
  writing-back a transactional store buffer entry that is marked for eviction.

* * * * *